United States Patent
Winesett et al.

(10) Patent No.: US 11,479,624 B2
(45) Date of Patent: Oct. 25, 2022

(54) PE-RT PIPES AND PROCESSES FOR MAKING THE SAME

(71) Applicant: ExxonMobil Chemical Patents Inc., Baytown, TX (US)

(72) Inventors: Donald A. Winesett, Houston, TX (US); Haiqing Peng, Sugar Land, TX (US); Antonios K. Doufas, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 294 days.

(21) Appl. No.: 16/757,891

(22) PCT Filed: Oct. 12, 2018

(86) PCT No.: PCT/US2018/055672
§ 371 (c)(1),
(2) Date: Apr. 21, 2020

(87) PCT Pub. No.: WO2019/099131
PCT Pub. Date: May 23, 2019

(65) Prior Publication Data
US 2020/0339715 A1    Oct. 29, 2020

Related U.S. Application Data

(60) Provisional application No. 62/587,531, filed on Nov. 17, 2017.

(51) Int. Cl.
*C08F 210/16*   (2006.01)
*C08L 23/16*   (2006.01)
(Continued)

(52) U.S. Cl.
CPC .............. *C08F 210/02* (2013.01); *F16L 9/12* (2013.01); *F16L 9/133* (2013.01); *C08F 210/16* (2013.01);
(Continued)

(58) Field of Classification Search
None
See application file for complete search history.

(56) References Cited

U.S. PATENT DOCUMENTS

| 4,461,873 A | 7/1984 | Bailey |
| 7,744,972 B2 | 6/2010 | Ho et al. |

(Continued)

FOREIGN PATENT DOCUMENTS

| CN | 1621725 B | 6/2005 |
| CN | 101352916 B | 5/2010 |

(Continued)

OTHER PUBLICATIONS

Detlef Schramm et al. (2006): "PE-RT, A New Class of Polyethylene for Industrial Pipes" 25th Int'l Conference on Offshore Mechanics and Artic Engineering, vol. 2006, Jun. 4, 2006, pp. 513-521.
(Continued)

*Primary Examiner* — Richard A Huhn
(74) *Attorney, Agent, or Firm* — ExxonMobil Chemical Patents Inc.-Law Department

(57) ABSTRACT

Provided herein are polyethylene compositions suitable in the fabrication of PE-RT pipes for use in cold and hot water plumbing in accordance with ISO 22391-2, and processes for making the same.

14 Claims, 3 Drawing Sheets

(51) Int. Cl.
 *C08F 210/02* (2006.01)
 *F16L 9/12* (2006.01)
 *F16L 9/133* (2006.01)
 *C08L 23/08* (2006.01)

(52) U.S. Cl.
 CPC ...... *C08F 2420/00* (2013.01); *C08F 2800/10* (2013.01); *C08L 23/0815* (2013.01); *C08L 23/16* (2013.01); *C08L 2203/18* (2013.01)

(56) References Cited

U.S. PATENT DOCUMENTS

| | | | |
|---|---|---|---|
| 9,587,055 | B2 | 3/2017 | Chai et al. |
| 2004/0054088 | A1 | 3/2004 | Kazakov |
| 2004/0242785 | A1 | 12/2004 | Palmlof |
| 2004/0266966 | A1 | 12/2004 | Schramm |
| 2005/0228139 | A1 | 10/2005 | Lee |
| 2007/0092675 | A1 | 4/2007 | Ho |
| 2010/0003439 | A1 | 1/2010 | Michie |
| 2011/0086191 | A1 | 4/2011 | Chai |
| 2015/0125645 | A1* | 5/2015 | Cheng ................. C08L 23/0815 428/36.9 |
| 2015/0159785 | A1 | 6/2015 | Tronc |
| 2015/0211673 | A1 | 7/2015 | Jan |
| 2016/0136907 | A1 | 5/2016 | Li |
| 2016/0298795 | A1 | 10/2016 | Vogt |

FOREIGN PATENT DOCUMENTS

| | | |
|---|---|---|
| CN | 104086845 | 10/2014 |
| CN | 102952323 B | 8/2015 |
| CN | 105037909 A | 11/2015 |
| CN | 103160014 | 6/2016 |
| CN | 105801986 A | 7/2016 |
| CN | 104262751 A | 8/2016 |
| CN | 105440192 B | 4/2018 |
| JP | 0912785 | 1/1997 |
| JP | 09194643 | 7/1997 |
| JP | 2004217802 | 8/2004 |
| WO | WO 2005/056657 A2 | 6/2005 |
| WO | 2016115636 A1 | 1/2016 |
| WO | 2016058908 A1 | 4/2016 |

OTHER PUBLICATIONS

Holger Bruening et al. (2016): "Polyethylene Used in Industrial Applications at Elevated Temperatures", Applied Soft Computing, Sep. 14, 2016, pp. 1-11.

J. Castillo Montes et al. (2011): Ageing of Polyethylene at Raised Temperature in Contact with Chlorinated Sanitary Hot Water. Part 1—Chemical Aspects, Polymer Degradation and Stability, vol. 97, No. 2, Nov. 26, 2011, pp. 149-157.

The Dow Chemical Company (2016): DOWLEX 2344 Polyethylene Resin (Product Sheet).

The Dow Chemical Company (2011): DOWLEX 2388 Polyethylene Resin (Product Sheet).

Detlef Schram, et al. (2006) "PE-RT, A New Class of Polyethylene for Industrial Pipes", 25th Int'l Conference on Offshore Mechanics and Artic Engineering, (Jun. 4, 2006), 9 pages.

J. Castillo Montes, et al. (2011), "Ageing of polyethylene at raised temperature in contact with chlorinated sanitary hot water. Part I—Chemical aspects", Polymer Degradation and Stability, vol. 97, No. 2, (Nov. 26, 2011), pp. 149-157.

* cited by examiner

PE-RT PIPES AND PROCESSES FOR MAKING THE SAME

CROSS-REFERENCE OF RELATED APPLICATIONS

This application is a National Phase Application claiming priority to PCT Application Serial No. PCT/US2018/055672, filed Oct. 12, 2018, which claims the benefit of Provisional Application U.S. Ser. No. 62/587,531, filed Nov. 17, 2017, the disclosures of which are incorporated herein by reference in their entirety.

FIELD OF THE INVENTION

The present invention generally relates to PE-RT pipes, and more specifically to PE-RT pipe made from polyethylene compositions, and processes for making the same.

BACKGROUND OF THE INVENTION

Polyethylene of raised temperature resistance ("PE-RT") is a class of polyethylene resins suitable for use in domestic hot and cold water piping systems such as underfloor heating and radiator connections. PE-RT resins have a molecular structure and crystalline microstructure which can provide long term hydrostatic strength at high temperature, without the need for cross-linking. PE-RT resins can be used in applications where temperatures otherwise limit the use of polyethylene ("PE") or where metallic materials will suffer from corrosion. Furthermore, the processing properties of a PE-RT resin makes it attractive for industrial applications.

For example, the PE-RT resin can be used in plastics to offer cost savings and provide other advantages such as high speed and flexible pipe production processes, and ease of installation for an application. Unlike other polyethylene ("PE"), random copolymer polypropylene ("PP-R"), polybutene ("PB") and to a lesser extent chlorinated PVC ("C-PVC"), each of which can be restricted by high temperature limitations, the versatility of PE-RT resins used at higher temperature make these polyethylene compositions useful over a wide range of applications, particularly, when temperature profiles can range from sub-ambient to beyond what is considered normal for a PE system.

Typical characteristics of a PE-RT resin include processability such as extrudability and maximizing pipe mechanical (short-term and long-term) properties. PE-RT pipes typically have small diameters, e.g., up to 20 mm, and are fabricated at relatively fast rates of production. A fast extrusion rate; however, can introduce finishing issues such as melt fracture and result in poor surface finish. Further, increased extrusion rates can impact properties such as the smooth surface finish required by the International Standard Organization ("ISO") 22391-2.

Therefore, a need exists for a PE-RT pipes that provide advantages in processing of the pipe over conventional linear low density polyethylene resins, particularly, in terms of melt index and shear thinning characteristics which will lower extrusion pressures and extruder/die temperature to allow faster extrusion rates.

SUMMARY OF THE INVENTION

Provided herein are PE-RT pipes comprising a polyethylene composition of linear low density polyethylene, medium density polyethylene, or high density polyethylene resins having at least 50% mole ethylene and an alpha-olefin co-monomer. The polyethylene compositions may have a molecular weight distribution ($M_w/M_n$) between 2 to 6, a long chain branching index g'vis between 0.85 to 0.99, a density between 0.934 to 0.960 g/cm3, and a shear thinning ratio between 1.0 to 100. The polyethylene compositions may include additives, including but not limited to, polymer processing aids, thermal stabilizers, antioxidants, fillers, slip agents, nucleators, flame retardants, and colorants. The polyethylene compositions may be produced with one or more metallocene catalysts and can be made into a blend by combination with another polyethylene composition or other material.

The PE-RT pipes may have a tensile strength at 5% strain that satisfies the following the relationship:

$$y > 6.1395 * x^{0.0579} + 0.2,$$

where y is the tensile strength (MPa) at 5% strain at 70° C. and x is the strain rate ($s^{-1}$).

In a class of embodiments, the invention provides for A PE-RT pipe made from a polyethylene composition comprising at least 50 mole percent ethylene derived units and one or more alpha-olefin co-monomer derived units, wherein the polyethylene composition has a molecular weight distribution ($M_w/M_n$) of from about 2 to about 6, a long chain branching index g'vis of from about 0.85 to about 0.99, a density of from about 0.934 to about 0.960 g/cm$^3$, and a shear thinning ratio of 1.0 to 100.

In another class of embodiments, the invention provides for a process to produce the PE-RT pipe as described herein.

In yet another class of embodiments, the invention provides for an assembly comprising the PE-RT pipe as described herein. The assembly may comprises two or more PE-RT pipes in fluid communication.

DESCRIPTION OF THE PREFERRED EMBODIMENTS

Figure 1:
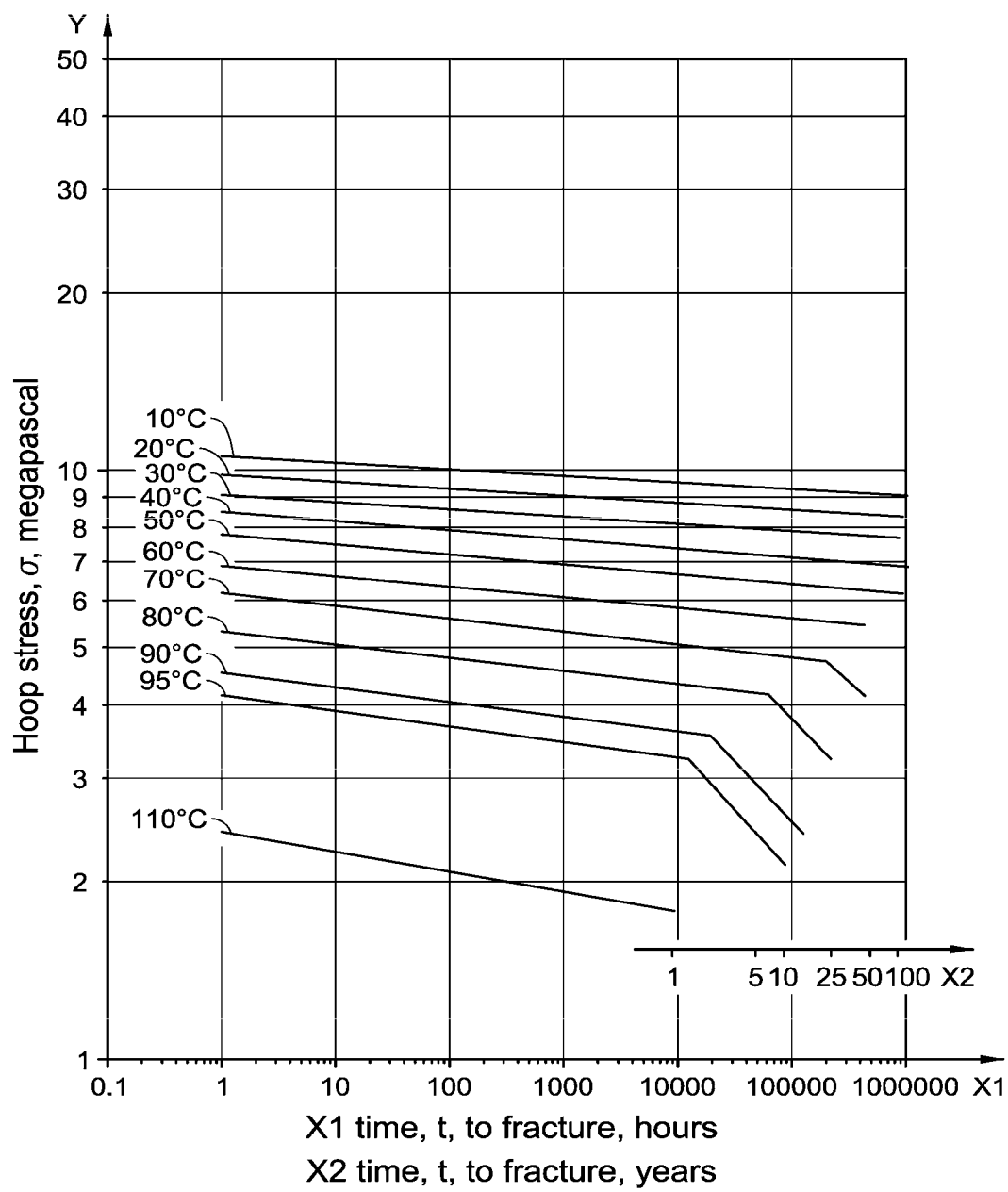
FIG. 1 is an ISO 22391-2 graph that represents the expected strength of PE-RT Type I pipes where X1 time, t, to fracture is expressed in hours, X2 time, t to fracture is expressed in years and Y, hoop stress is expressed in megapascal.

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" can refer to one or more, but not necessarily all, of the inventions defined by the claims.

As used herein, the term "metallocene catalyst" refers to a catalyst having at least one transition metal compound containing one or more substituted or unsubstituted cyclopentadienyl moiety ("Cp") (typically two Cp moieties) in combination with a Group 4, 5, or 6 transition metal (M). As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997), unless reference is made to the Previous IUPAC form denoted with Roman numerals (also appearing in the same), or unless otherwise noted. A metallocene catalyst is considered a single site catalyst. Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system can be supported on a carrier, typically an inorganic oxide or chloride or a resinous material such as, for example, polyethylene or silica.

The term linear medium density polyethylene ("MDPE") refers to a polyethylene copolymer having a density from about 0.930 g/cm$^3$ to about 0.950 g/cm$^3$. Polymers having more than two types of monomers, such as terpolymers, are also included within the term "copolymer."

The composition distribution breadth index ("CDBI") refers to the weight percent of the copolymer molecules having a comonomer content within 50% of the median total molar comonomer content. The CDBI of any copolymer is determined utilizing known techniques for isolating individual fractions of a sample of the copolymer. Temperature Rising Elution Fraction (TREF) is described in Wild, et al., J. Poly. Sci., Poly. Phys. Ed., Vol. 20, pg. 441 (1982) as well as in U.S. Pat. No. 5,008,204.

As used herein, the shear thinning ratio refers to the complex viscosity at 190° C. at 0.01 rad/s over the complex viscosity at 190° C. at 100 rad/s (or the nearest point).

Molecular weight distribution ("MWD") is equivalent to the expression Mw/Mn. The expression Mw/Mn is the ratio of the weight average molecular weight ("Mw") to the number average molecular weight ("Mn"). The weight average molecular weight is given by $$M_w = \frac{\sum_i n_i M_i^2}{\sum_i n_i M_i},$$

the number average molecular weight is given by $$M_n = \frac{\sum_i n_i M_i}{\sum_i n_i},$$

the z-average molecular weight is given by $$M_z = \frac{\sum_i n_i M_i^3}{\sum_i n_i M_i^2},$$

where $n_i$ in the foregoing equations is the number fraction of molecules of molecular weight $M_i$. Measurements of Mw, Mz, and Mn are typically determined by Gel Permeation Chromatography as disclosed in Macromolecules, Vol. 34, No. 19, pg. 6812 (2001). The measurements proceed as follows. Gel Permeation Chromatography (Agilent PL-220), equipped with three in-line detectors, a differential refractive index detector (DRI), a light scattering (LS) detector, and a viscometer, is used. Experimental details, including detector calibration, are described in: T. Sun, P. Brant, R. R. Chance, and W. W. Graessley, Macromolecules, Volume 34, Number 19, pp. 6812-6820, (2001). Three Agilent PLgel 10 µm Mixed-B LS columns are used. The nominal flow rate is 0.5 mL/min, and the nominal injection volume is 300 µL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 µm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at about 21° C. and 1.284 g/ml at 145° C. The injection concentration is from 0.5 to 2.0 mg/ml, with lower concentrations being used for higher molecular weight samples. Prior to running each sample, the DRI detector and the viscometer are purged. The flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI} / (dn/dc),$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm$^3$, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{M P(\theta)} + 2 A_2 c.$$

Here, $\Delta R(\theta)$ is the measured excess Rayleigh scattering intensity at scattering angle $\theta$, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system, which take the same value as the one obtained from DRI method. The refractive index, n=1.500 for TCB at 145° C. and $\lambda$=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [$\eta$], at each point in the chromatogram is calculated from the following equation:

$$\eta_s = c[\eta] + 0.3(c[\eta])^2,$$

where c is concentration and was determined from the DRI output.

The branching index ($g'_{vis}$) is calculated using the output of the GPC-DRI-LS-VIS method as follows. The average intrinsic viscosity, $[\eta]_{avg}$ of the sample is calculated by:

$$[\eta]_{avg} = \frac{\sum c_i [\eta]_i}{\sum c_i},$$

where the summations are over the chromatographic slices, i, between the integration limits.

The branching index $g'_{vis}$ is defined as:

$$g'vis = \frac{[\eta]_{avg}}{kM_v^a}.$$

$M_V$ is the viscosity-average molecular weight based on molecular weights determined by LS analysis. Z average branching index ($g'z_{ave}$) is calculated using Ci=polymer concentration in the slice i in the polymer peak times the mass of the slice squared, $Mi^2$. All molecular weights are weight average unless otherwise noted. All molecular weights are reported in g/mol unless otherwise noted. This method is the preferred method of measurement and used in the examples and throughout the disclosures unless otherwise specified. See also, for background, Macromolecules, Vol. 34, No. 19, *Effect of Short Chain Branching on the Coil Dimensions of Polyolefins in Dilute Solution*, Sun et al., pg. 6812-6820 (2001).

In an extrusion process, viscosity is a measure of resistance to shearing flow. Shearing is the motion of a fluid, layer-by-layer, like a deck of cards. When polymers flow through straight tubes or channels, they are sheared and the resistance is expressed by the viscosity. The melt index ("MI") is the number of grams extruded in 10 minutes under the action of a standard load and is an inverse measure of viscosity. A high melt index implies low viscosity and low melt index means high viscosity. In addition, polymers are shear thinning, which means that their resistance to flow decreases as the shear rate increases. This is due to molecular alignments in the direction of flow and disentanglements.

Extensional or elongational viscosity is the resistance to stretching. In fiber spinning, in film blowing and other process where molten polymers are stretched, the elongational viscosity plays a role. For example, for certain liquids, the resistance to stretching can be three times larger than in shearing. For some polymeric liquids, the elongational viscosity can increase (tension stiffening) with the rate, although the shear viscosity decreased.

Melt strength is a measure of the extensional viscosity and is defined as the maximum tension that can be applied to the melt without breaking. Extensional viscosity is the polymer's ability to resist thinning at high draw rates and high draw ratios. In melt processing of polyolefins, the melt strength is defined by two key characteristics that can be quantified in process related terms and in rheological terms. In extrusion blow molding and melt phase thermoforming, a branched polyolefin of the appropriate molecule weight can support the weight of the fully melted sheet or extruded parison prior to the forming stage. This behavior is sometimes referred to as sag resistance.

When LLDPE are extended in the melt phase, because of the lack of long chain branching, the chains align and tend to slide over one another. There is a momentary point where they begin to exhibit an increase in viscosity that is immediately flowed by the onset of shear thinning. The melt will thin out from specific points where the critical draw rate or draw ratio has been exceed. So, while a lower elongational viscosity permits the LLDPE to be easily down gaged since there is no strong tension stiffening, the low elongational viscosity and melt strength is often bad for formation of larger diameter PE-RT pipes.

Therefore, as provided herein, the present PE-RT resins/polyethylene compositions can improve melt strength and shear thinning which can lower extrusion pressure and melt temperature to allow for faster extrusion rates. Through use of the polyethylene compositions described herein, the PE-RT pipes can be produced at relatively fast extrusion rates without many of the finishing issues typically associated with the conventional processing of PE-RT pipe.

As described herein, the polyethylene composition comprises from about 50.0 mole % to 100.0 mole % of units derived from ethylene. The lower limit on the range of ethylene content can be from 50.0 mole %, 75.0 mole %, 80.0 mole %, 85.0 mole %, 90.0 mole %, 92.0 mole %, 94.0 mole %, 95.0 mole %, 96.0 mole %, 97.0 mole %, 98.0 mole %, or 99.0 mole % based on the mole % of polymer units derived from ethylene. The polyethylene composition can have an upper limit on the range of ethylene content of 80.0 mole %, 85.0 mole %, 90.0 mole %, 92.0 mole %, 94.0 mole %, 95.0 mole %, 96.0 mole %, 97.0 mole %, 98.0 mole %, 99.0 mole %, 99.5 mole %, or 100.0 mole %, based on polymer units derived from ethylene.

Comonomer content is based on the total content of all monomers in the polymer. The polyethylene copolymer has minimal long chain branching (i.e., less than 1.0 long-chain branch/1000 carbon atoms, preferably particularly 0.05 to 0.50 long-chain branch/1000 carbon atoms). Such values are characteristic of a linear structure that is consistent with a branching index (as defined below) of $g'_{vis} \geq 0.980$, 0.985, $\geq 0.99$, $\geq 0.995$, or 1.0. While such values are indicative of little to no long chain branching, some long chain branches can be present (i.e., less than 1.0 long-chain branch/1000 carbon atoms, preferably less than 0.5 long-chain branch/ 1000 carbon atoms, particularly 0.05 to 0.50 long-chain branch/1000 carbon atoms).

In another class of embodiments, the polyethylene compositions provided herein are ethylene-based copolymers having about 99.0 to about 80.0 wt %, 99.0 to 85.0 wt %, 99.0 to 87.5 wt %, 99.0 to 90.0 wt %, 99.0 to 92.5 wt %, 99.0 to 95.0 wt %, or 99.0 to 97.0 wt %, of polymer units derived from ethylene and about 1.0 to about 20.0 wt %, 1.0 to 15.0 wt %, 1.0 to 12.5 wt %, 1.0 to 10.0 wt %, 1.0 to 7.5 wt %, 1.0 to 5.0 wt %, or 1.0 to 3.0 wt % of polymer units derived from one or more $C_3$ to $C_{20}$ α-olefin comonomers, preferably $C_3$ to $C_{10}$ α-olefins, and more preferably $C_4$ to $C_8$ α-olefins. The α-olefin comonomer can be linear, branched, cyclic and/or substituted, and two or more comonomers can be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Particularly suitable comonomers include 1-butene, 1-hexene, and 1-octene, 1-hexene, and mixtures thereof.

In some compositions, the polyethylene composition comprises from about 8 wt % to about 15 wt %, of $C_3$-$C_{10}$ α-olefin derived units, and from about 92 wt % to about 85 wt % ethylene derived units, based upon the total weight of the copolymer.

In other compositions, the polyethylene composition comprises from about 9 wt % to about 12 wt %, of $C_3$-$C_{10}$ α-olefin derived units, and from about 91 wt % to about 88 wt % ethylene derived units, based upon the total weight of the polymer for example.

The polyethylene compositions have a melt index (MI), $I_{2.16}$ or simply $I_2$ for shorthand according to ASTM D1238, condition E (190° C./2.16 kg) reported in grams per 10 minutes (g/10 min), of ≥about 0.10 g/10 min, e.g., ≥about 0.15 g/10 min, ≥about 0.18 g/10 min, ≥about 0.20 g/10 min, ≥about 0.22 g/10 min, ≥about 0.25 g/10 min, ≥about 0.28, or ≥about 0.30 g/10 min. Additionally, the second polyethylene polymers can have a melt index ($I_{2.16}$)≤about 3.0 g/10 min, ≤about 2.0 g/10 min, ≤about 1.5 g/10 min, ≤about 1.0 g/10 min, ≤about 0.75 g/10 min, ≤about 0.50 g/10 min, ≤about 0.40 g/10 min, ≤about 0.30 g/10 min, ≤about 0.25 g/10 min, ≤about 0.22 g/10 min, ≤about 0.20 g/10 min, ≤about 0.18 g/10 min, or ≤about 0.15 g/10 min. Ranges expressly disclosed include, but are not limited to, ranges formed by combinations any of the above-enumerated values, e.g., from about 0.1 to about 5.0, about 0.2 to about 2.0, about 0.2 to about 0.5 g/10 min, etc.

The polyethylene compositions also have High Load Melt Index (HLMI), $I_{21.6}$ or $I_{21}$ for shorthand, measured in accordance with ASTM D-1238, condition F (190° C./21.6 kg). For a given polymer having an MI and MIR as defined herein, the HLMI is fixed and can be calculated in accordance with the following paragraph.

The polyethylene compositions can have a Melt Index Ratio (MIR) which is a dimensionless number and is the ratio of the high load melt index to the melt index, or $I_{21.6}/I_{2.16}$ as described above. The MIR of the second polyethylene polymers can be from 25 to 80, alternatively, from 25 to 70, alternatively, from about 30 to about 55, and alternatively, from about 35 to about 50.

The polyethylene compositions can have a density≥about 0.930 g/cm³, ≥about 0.935 g/cm³, ≥about 0.940 g/cm³, ≥about 0.945 g/cm³, ≥about 0.950 g/cm³, ≥about 0.955 g/cm³, ≥and about 0.960 g/cm³. Alternatively, polyethylene compositions can have a density≤about 0.960 g/cm³ about 0.945 g/cm³, e.g., ≤about 0.940 g/cm³, ≤about 0.937 g/cm³, ≤about 0.935 g/cm³, and ≤about 0.930 g/cm³. Ranges expressly disclosed include, but are not limited to, ranges formed by combinations any of the above-enumerated values, e.g., from about 0.930 to about 0.945 g/cm³, 0.930 to about 0.935 g/cm³, 0.9350 to 0.940 g/cm³, 0.935 to 0.950 g/cm³, etc. Density is determined using chips cut from plaques compression molded in accordance with ASTM D-1928 Procedure C, aged in accordance with ASTM D-618 Procedure A, and measured as specified by ASTM D-1505.

The polyethylene compositions can have a molecular weight distribution (MWD, defined as $M_w/M_n$) of about 2 to about 6, preferably 3.0 to 4.0.

The branching index, g'vis is inversely proportional to the amount of branching. Thus, lower values for g' indicate relatively higher amounts of branching. The amounts of short and long-chain branching each contribute to the branching index according to the formula:

$$g' = g'_{LCB} \times g'_{SCB}.$$

Typically, the polyethylene compositions have a g'vis of 0.85 to 0.99, particularly, 0.87 to 0.97, 0.89 to 0.97, 0.91 to 0.97, 0.93 to 0.95, or 0.97 to 0.99.

The polyethylene composition can be made by any suitable polymerization method including solution polymerization, slurry polymerization, supercritical, and/or gas phase polymerization using supported or unsupported catalyst systems, such as a system incorporating one or more metallocene catalysts.

Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system can be supported on a carrier, typically an inorganic oxide or chloride or a resinous material such as, for example, polyethylene or silica.

Examples of useful metallocene catalysts/systems for producing polyethylene compositions desired herein include bridged and unbridged biscyclopentadienyl zirconium compounds (particular where the Cp rings are indenyl or fluorenyl groups). Non-limiting examples of metallocene catalysts and catalyst systems include those disclosed in WO 96/11961 and WO 96/11960, and in U.S. Pat. Nos. 4,808,561; 5,017,714; 5,055,438; 5,064,802; 5,124,418; 5,153,157, and 5,324,800. Additional examples include the catalysts and catalyst systems described in U.S. Pat. Nos. 6,380,122 and 6,376,410, and WO 01/98409.

Zirconium transition metal metallocene-type catalyst systems are particularly suitable. Non-limiting examples of metallocene catalysts and catalyst systems useful to make the present polyethylene compositions described herein include those described in, U.S. Pat. Nos. 5,466,649; 6,476,171; 6,225,426; and 7,951,873, and in the references cited therein. Particularly useful catalyst systems include supported dimethylsilyl bis(tetrahydroindenyl) zirconium dichloride.

Supported polymerization catalyst can be deposited on, bonded to, contacted with, or incorporated within, disposed on, adsorbed or absorbed in, or on, a support or carrier. In another embodiment, the metallocene is introduced onto a support by slurrying a presupported activator in oil, a hydrocarbon such as pentane, solvent, or non-solvent, then adding the metallocene as a solid while stirring. The metallocene can be finely divided solids. Although the metallocene is typically of very low solubility in the diluting medium, it is found to distribute onto the support and be active for polymerization. Very low solubilizing media such as mineral oil (e.g., Kaydo™ or Drakol™) or pentane can be used. The diluent can be filtered off and the remaining solid shows polymerization capability much as would be expected if the catalyst had been prepared by traditional methods such as contacting the catalyst with methylalumoxane in toluene, contacting with the support, followed by removal of the solvent. If the diluent is volatile, such as pentane, it can be removed under vacuum or by nitrogen purge to afford an active catalyst. The mixing time can be greater than 4 hours, but shorter times are suitable.

In a gas phase polymerization process, a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See e.g., U.S. Pat. Nos. 4,543,399; 4,588,790; 5,028,670; 5,317,036; 5,352,749; 5,405,922; 5,436,304; 5,453,471; 5,462,999; 5,616,661; and 5,668,228.) To obtain the copolymers, individual flow rates of ethylene, comonomer, and hydrogen should be controlled and adjusted to obtain the desired polymer properties.

Suitable commercial polyethylene compositions are available from ExxonMobil Chemical Company, Houston, TX, as ENABLE® metallocene polyethylene resins ("ENABLE® mPE" or "ENABLE®") polyethylene compositions (resins) as described below. ENABLE® mPE polyethylene compositions offer an excellent balance between processability and mechanical properties, including tensile strength and elongation to break that leads to high-pressure PE-RT pipe with advanced drawdown and enhanced pipe rupture (failure) time and toughness. For example, ENABLE 3505 HH is a medium density metallocene ethylene-hexene copolymer including a processing aid additive, a thermal stabilizer additive, and having a density of about 0.935 g/cm$^3$ and melt index 190° C./kg of about 0.5 g/10 min. Applications for ENABLE products include but are not limited to food packaging, form fill, and seal packaging, heavy duty bags, lamination film, stand up pouches, multilayer packaging film, and shrink film.

Likewise, ENABLE MC is yet another medium density metallocene ethylene-hexene copolymer including a processing aid additive, a thermal stabilizer, and having density of about 0.935 g/cm$^3$ and melt index 190° C./2.16 kg of about 0.5 g/10 min. It is useful in food packaging, form fill and seal packaging, heavy duty bags, lamination film, stand-up pouches, multilayer packaging film, and shrink film.

The polyethylene compositions and end-use application of PE-RT pipe as described herein can comprise a linear low density polyethylene ("LLDPE") copolymer having at least 50 percent ethylene and at least one α-olefin co-monomer. The co-monomer can have from 3 to about 20 carbon atoms. The polyethylene composition can have a composition distribution breadth index ("CDBI") of at least 70% and a melt index ("MI") as measured at 190° C. and 2.16 kg from about 0.1 to about 15 g/10 min. The polyethylene composition can have a molecular weight distribution ("MWD)" from about 2 to about 6.

As described herein, the polyethylene composition can include LLDPE which is a copolymer of ethylene and at least one other alpha-olefin ("α-olefin"). Co-monomers useful for making LLDPE copolymers include alpha-olefins, such as $C_3$-$C_{20}$ alpha-olefins, preferably $C_3$-$C_{10}$ alpha-olefins, and more preferably $C_3$-$C_8$ alpha-olefins. The alpha-olefin co-monomer can be linear or branched, and two or more comonomers can be used, if desired. Examples of suitable comonomers include propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene.

Specifically, but without limitation, the combinations of ethylene with co-monomer can include: ethylene propylene, ethylene butene, ethylene 1-pentene; ethylene 4-methyl-1-pentene; ethylene 1-hexene; ethylene 1-octene; ethylene decene; ethylene dodecene; ethylene 1-hexene 1-pentene; ethylene 1-hexene 4-methyl-1-pentene; ethylene 1-hexene 1-octene; ethylene 1-hexene decene; ethylene 1-hexene dodecene; ethylene 1-octene 1-pentene; ethylene 1-octene 4-methyl-1-pentene; ethylene 1-octene 1-hexene; ethylene 1-octene decene; ethylene 1-octene dodecene; combinations thereof and like permutations.

Generally, LLDPE copolymers can be obtained via a continuous gas phase polymerization using supported catalyst comprising an activated molecularly discrete catalyst in the substantial absence of an aluminum alkyl based scavenger (e.g., triethylaluminum (TEAL), trimethylaluminum (TMAL), triisobutyl aluminum (TIBAL), tri-n-hexylaluminum (TNHAL), and the like).

Representative LLDPEs produced using these catalysts generally each have a melt index of from 0.1 to 15 g/10 min, a CDBI of at least 70%, a density from 0.910 to 0.945 g/ml, a haze value of less than 20%, a melt index ratio (MIR), $I_{21.6}/I_{2.16}$, from 25 to 70. While prior art processes and polymers can be similar, none describe LLDPE copolymers having good shear thinning and therefore relatively favorable extrusion and other melt processing properties with a high stiffness and high impact strength for use as a PE-RT pipe. For example, in comparison to LDPE (low density polyethylene) made in a high pressure polymerization process and having a comparable density and MI, the LLDPE copolymer used in the present PE-RT pipe have a favorable processability/mechanical properties balance for PE-RT pipe applications. Likewise, in comparison with LLDPE copolymer made by a gas phase process using conventional Ziegler-Natta supported catalysts, the present polyethylene copolymers have improved shear thinning characteristics.

LLDPE copolymers have a composition distribution breadth index of at least 70%, a melt index $I_{2.16}$ from about 0.3 to about 2.0 g/10 min, a melt index ratio, $I_{21.6}/I_{2.16}$, of from about 25 to about 50, a molecular weight distribution by GPC from about 2.5 to about 5.5, and a density from about 0.915 to about 0.940. The LLDPE copolymers can be combined with at least one additional polymer that is a high density polyethylene, a linear low density polyethylene, a low density polyethylene, a medium density polyethylene, a differentiated polyethylene, or combinations thereof. The LLDPE copolymers can also be combined with at least one additional polymer that is a very low density polyethylene, an ethylene- or propylene-based polymer, a polymer derived from one or more dienes, and/or combinations thereof.

As to the reactor process conditions used to produce polyethylene, the overall conditions are described in U.S. Pat. No. 5,763,543 can be used. A combination of process conditions can be beneficial in making the LLDPE copolymers described herein. For example, it is advantageous to use a catalyst system in which the metallocene has a pair of bridged cyclopentadienyl groups, preferably with the bridge consisting of a single carbon, germanium or silicon atom to provide an open site on the catalytically active cation. The activator can be methyl alumoxane as described in U.S. Pat. Nos. 5,324,800; 5,580,939; and 5,633,394, or a non-coordinated anion as described in U.S. application Ser. No. 08/133,480. Additionally, there should be substantially no scavengers which can interfere with the reaction between the vinyl end unsaturation of polymers formed and the open active site on the cation. By the statement "substantially no scavengers" and "substantially devoid or free of Lewis acid scavengers", it is meant that there should be less than 100 ppm by weight of such scavengers present in the feed gas, or preferably, no intentionally added scavenger, such as, for example, an aluminum alkyl scavenger, other than that which can be present on the support.

Conditions for the production of the LLDPE copolymers can include steady state polymerization conditions which are not likely to be provided by batch reactions in which the amount of catalyst poisons can vary and where the concentration of the comonomer can vary in the production of the batch.

The overall continuous gas phase processes for the polymerization of the LLDPE compositions herein can therefore comprise: (1) continuously circulating a feed gas stream containing monomer and inerts to thereby fluidize and agitate a bed of polymer particles; (2) adding metallocene catalyst to the bed; and (3) removing polymer particles, in which: a) the catalyst comprises at least one bridged bis cyclopentadienyl transition metal and an alumoxane activator on a common or separate porous support; b) the feed gas is substantially devoid of a Lewis acidic scavenger and wherein any Lewis acidic scavenger is preferably present in an amount less than 100 ppm by weight of the feed gas; c) the temperature in the bed is no more than 20° C. less than the polymer melting temperature as determined by DSC, at a ethylene partial pressure in excess of 60 pounds per square inch absolute (414 kPaa); and d) the removed polymer particles have an ash content of transition metal of less than 500 ppm by weight, an MI less than 10, an MIR at least 35, and substantially no detectable chain end unsaturation as determined by HNMR.

By the statement that the polymer has substantially no detectable end chain unsaturation, it is meant that the polymer has vinyl unsaturation of less than 0.1 vinyl groups per 1000 carbon atoms in the polymer, preferably less than 0.05 vinyl groups per 1000 carbon atoms, and more preferably 0.01 vinyl groups per 1000 carbon atoms or less.

The processes described above can provide LLDPE copolymer via the use of a single catalyst, and the processes do not depend on the interaction of bridged and unbridged species. Preferably, the catalyst is substantially devoid of a metallocene having a pair of pi-bonded ligands (e.g., cyclopentadienyl compounds) which are not connected through a covalent bridge. In other words, no such metallocene is intentionally added to the catalyst or, preferably, no such metallocene can be identified in such catalyst. Additionally, the processes use substantially a single metallocene species comprising a pair of pi-bonded ligands, at least one of which has a structure with at least two cyclic fused rings (e.g., indenyl rings). Best results can be obtained by using a substantially single metallocene species comprising a monoatom silicon bridge connecting two polynuclear pi-bonded ligands to the transition metal atom.

The catalyst is preferably supported on silica with the catalyst homogeneously distributed in the silica pores. Preferably, fairly small amounts of methyl alumoxane should be used, such as amounts giving an Al to transition metal ratio of from 400 to 30, and especially of from 200 to 50.

In order to obtain a desired melt index ratio (i.e., 40 to 50), both the molar ratio of ethylene and comonomer and the concentration of the comonomer can be varied. Control of the temperature can help control the MI. Overall monomer partial pressures can be used which correspond to conventional practice for gas phase polymerization of LLDPE.

The above-described processes can be tailored to achieve desired polyethylene compositions. For example, comonomer to ethylene concentration or flow rate ratios are commonly used to control density. Similarly, hydrogen to ethylene concentrations or flow rate ratios are commonly used to control molecular weight. In both cases, higher levels of a modifier results in lower values of the respective resin parameter. Gas concentrations can be measured by, for example, an on-line gas chromatograph or similar apparatus to ensure relatively constant composition of recycle gas streams. Optimization of these modifier ratios and the given reactor conditions can achieve a targeted melt index, density, and/or other resin properties.

As provided herein, the present polyethylene compositions are useful as pipe made of polyethylene of raised temperature ("PE-RT") or for PE-RT pipe. Fabricated pipe using these PE-RT qualified resins (referred to herein as "polyethylene compositions") must meet a range of performance specifications depending on the end use of the pipe and geographically specific regulations. The PE-RT specifications are provided in ISO 22391-2 which specify the pipe characteristics necessary for hot and cold water handling within building construction applications. The primary mechanical specification of ISO 22391-1 is the pipe's resistance to bursting under hydrodynamic (hoop) stress at various temperatures and times. In addition to long term burst resistance, a key resin characteristic is extrudability (extruder processability) since these pipes are typically small diameter (up to 20 mm) fabricated at relatively fast extrusion rates which can introduce finishing issues such as melt fracture resulting in a poor surface finish and possibly impacting properties. As described below in detail, another requirement of ISO 22391-2 is an unblemished, smooth surface finish.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Test Methods

Pipe Made of Polyethylene of Raised Temperature Resistance (PE-RT)

International Organization for Standardization (ISO) 22391-2 specifies the characteristics of pipe made of polyethylene of raised temperature resistance ("PE-RT"), Type I intended to be used for hot and cold water installations within buildings for the conveyance of water, whether or not the water is intended for human consumption (domestic systems), and for heating systems, under the design pressures and temperatures appropriate to the class of application according to ISO 22391-1.

Evaluation of $\sigma_{LPL}$ Values

Pipe material as used herein refers to the material from which the pipe is made and means the polyethylene compositions described herein as polyethylene of raised temperature resistance ("PE-RT"). Pipe material is evaluated in accordance with ISO 9080 or equivalent, with internal pressure tests carried out in accordance with ISO 1167-1 and ISO 1167-2, to determine the $\sigma_{LPL}$ values. The $\sigma_{LPL}$ value is at least as high as the corresponding values of the reference curves given in FIG. 1 (taken from ISO 24033:2009) over the complete range of times. Alternatively, one equivalent way of evaluation is to calculate the $\sigma_{LPL}$ value for each temperature individually.

The reference curves for PE-RT Type I in FIG. 1 in the temperature range of 10° C. to 95° C. are derived from Equations (1) and (2). First branch (i.e., the left-hand portion of the lines shown in FIG. 1):

$$lgt = -190{,}481 - \frac{58\,291{,}035\ lg\sigma}{T} + \frac{78\,763{,}07}{T} + 119{,}877\ lg\sigma, \quad (1)$$

Second branch (i.e., the right-hand portion of the lines shown in FIG. 1):

$$lgt = -27{,}7954 - \frac{1723{,}318\ lg\sigma}{T} + \frac{11150{,}56}{T}. \quad (1)$$

The 110° C. values are determined separately using water inside and air outside the test specimen and are not derived from Equations (1) and (2).

In order to demonstrate conformance to the reference lines, pipe samples should be tested in accordance with ISO 1167-1 and ISO 1167-2 at the following temperatures: 20° C.; 60° C. to 70° C.; and 95° C., and at various hoop stresses such that, at each of the temperatures, at least three failure times fall in each of the following time intervals: 10 h to 100 h; 100 h to 1,000 h; 1,000 h to 8,760 h and over. In tests lasting more than 8,760 h without failure, any test time after 8,760 h can be considered as the failure time.

Geometrical Characteristics of Pipe

Dimensions are measured in accordance with ISO 3126. The maximum calculated pipe value, $S_{calc,\ max}$, for the applicable class of service condition and design pressure, $p_D$, are in accordance with Table 1 for PE-RT Type I. The values of outside diameter and wall thickness apply to the PE-RT pipe and, for design calculation purposes, are exclusive of any barrier layer thickness.

TABLE 1

$S_{calc,\ max}$ Values for PE-RT Type I

| $p_D$ bar[c] | Application Class | | | |
|---|---|---|---|---|
| | 1 | 2 | 3 | 4 |
| | $S_{calc,\ max}$ values[a] | | | |
| 4 | 6.7[b] | 6.7[b] | 6.7[b] | 6.0 |
| 6 | 5.5 | 4.5 | 5.4 | 4.0 |
| 8 | 4.1 | 3.4 | 4.1 | 3.0 |
| 10 | 3.3 | 2.7 | 3.3 | 2.4 |

[a]The values are rounded to the first decimal place.
[b]The 20° C., 10 bar, 50 years, cold water requirement, being higher, determines this value (see ISO 22391-1:2009, Clause 4).
[c]1 bar = 0.1 MPa = $10^5$ Pa; 1 MPa = 1 N/mm².

General Dimensions of Pipe

For corresponding pipe dimension class, the mean outside diameter, $d_{em}$ of pipe is in accordance with Tables 2, 3, 4, and 5 below.

Wall Thicknesses and Tolerances

For any particular class of service condition, design pressure and nominal size, the minimum wall thickness, $e_{min}$, is such that the corresponding S series or $S_{calc}$ value is less than or equal to the values of $S_{calc,\ max}$ given in Table 1. For the corresponding pipe dimension class, the wall thicknesses, $e_{min}$ and $e_n$, is in accordance with Tables 2, 3, 4 or 5 as applicable, in respect of pipe series S or $S_{calc}$ values. However, pipes joined together by fusion have a minimum wall thickness of 1.9 mm. The tolerance on the wall thickness, e, is in accordance with Table 6.

TABLE 2

Pipe Dimensions for Dimension Class A
(sizes in accordance with ISO 4065 and
applicable for all classes of service condition)

| Nominal Size DN/OD | Nominal Outside Diameter $d_n$ | Mean Outside Diameter | | Pipe Series | | | |
|---|---|---|---|---|---|---|---|
| | | | | S 5 | S 4 | S 3.2 | S 2.5 |
| | | | | Wall Thicknesses | | | |
| | | $d_{em,\ min}$ | $d_{em,\ max}$ | $e_{min}$ and $e_n$ | | | |
| 12 | 12 | 12.0 | 12.3 | 1.3[a] | 1.4 | 1.7 | 2.0 |
| 16 | 16 | 16.0 | 16.3 | 1.5 | 1.8 | 2.2 | 2.7 |
| 20 | 20 | 20.0 | 20.3 | 1.9 | 2.3 | 2.8 | 3.4 |
| 25 | 25 | 25.0 | 25.3 | 2.3 | 2.8 | 3.5 | 4.2 |

TABLE 2-continued

Pipe Dimensions for Dimension Class A
(sizes in accordance with ISO 4065 and
applicable for all classes of service condition)

| Nominal Size | Nominal Outside | Mean Outside Diameter | | Pipe Series | | | |
|---|---|---|---|---|---|---|---|
| | | | | S 5 | S 4 | S 3.2 | S 2.5 |
| | | | | Wall Thicknesses | | | |
| DN/OD | Diameter $d_n$ | $d_{em, min}$ | $d_{em, max}$ | $e_{min}$ and $e_n$ | | | |
| 32 | 32 | 32.0 | 32.3 | 2.9 | 3.6 | 4.4 | 5.4 |
| 40 | 40 | 40.0 | 40.4 | 3.7 | 4.5 | 5.5 | 6.7 |
| 50 | 50 | 50.0 | 50.5 | 4.6 | 5.6 | 6.9 | 8.3 |
| 63 | 63 | 63.0 | 63.6 | 5.8 | 7.1 | 8.6 | 10.5 |
| 75 | 75 | 75.0 | 75.7 | 6.8 | 8.4 | 10.3 | 12.5 |
| 90 | 90 | 90.0 | 90.9 | 8.2 | 10.1 | 12.3 | 15.0 |
| 110 | 110 | 110.0 | 111.0 | 10.0 | 12.3 | 15.1 | 18.3 |
| 125 | 125 | 125.0 | 126.2 | 11.4 | 14.0 | 17.1 | 20.8 |
| 140 | 140 | 140.0 | 141.3 | 12.7 | 15.7 | 19.2 | 23.3 |
| 160 | 160 | 160.0 | 161.5 | 14.6 | 17.9 | 21.9 | 26.6 |

[a] A non-preferred wall thickness of 1.1 mm is permitted for $d_n = 12$.

Dimensions in millimeters

TABLE 3

Pipe Dimensions for Dimension Class B1 (sizes based on copper
pipe sizes and applicable for all classes of service condition)

| Nominal Size | Nominal Outside | Mean Outside Diameter | | Wall Thicknesses | |
|---|---|---|---|---|---|
| DN/OD | Diameter $d_n$ | $d_{em, min}$ | $d_{em, max}$ | $e_n$ | $e_{min}$ |
| 10 | 10 | 9.9 | 10.2 | 1.5 | 1.5 |
| | | | | 1.8 | 1.7 |
| 12 | 12 | 11.9 | 12.2 | 1.5 | 1.5 |
| | | | | 2.0 | 1.9 |
| 15 | 15 | 14.9 | 15.2 | 1.5 | 1.5 |
| | | | | 2.5 | 2.4 |
| 18 | 18 | 17.9 | 18.2 | 1.7 | 1.7 |
| | | | | 2.5 | 2.4 |
| 22 | 22 | 21.9 | 22.2 | 2.0 | 2.0 |
| | | | | 3.0 | 2.9 |
| 28 | 28 | 27.9 | 28.2 | 2.6 | 2.6 |
| | | | | 4.0 | 3.9 |

TABLE 4

Pipe Dimensions for Dimension Class B2

| Nominal Size | Nominal Outside | Mean Outside Diameter | | Wall Thicknesses | |
|---|---|---|---|---|---|
| DN/OD | Diameter Dn | $d_{em, min}$ | $d_{em, max}$ | $e_{min}$ and $e_n$ | $S_{calc}$ |
| 14.7 | 14.7 | 14.63 | 14.74 | 1.6 | 4.1 |
| 21 | 21 | 20.98 | 21.09 | 2.05 | 4.6 |
| 27.4 | 27.4 | 27.33 | 27.44 | 2.6 | 4.8 |
| 34 | 34 | 34.08 | 34.19 | 3.15 | 4.9 |

Dimensions in millimeters

TABLE 5

Pipe Dimensions for Dimension Class C

| Nominal Size DN/OD | Nominal Outside Diameter Dn | Mean Outside Diameter $d_{em, min}$ | Mean Outside Diameter $d_{em, max}$ | Wall Thicknesses $e_{min}$ and $e_n$ | $S_{calc}$ |
|---|---|---|---|---|---|
| 12 | 12 | 12.0 | 12.3 | 2.0 | 2.5 |
| 14 | 14 | 14.0 | 14.3 | 2.0 | 3.0 |
| 15 | 15 | 15.0 | 15.3 | 2.0 | 3.2 |
| 16 | 16 | 16.0 | 16.3 | 2.0 | 3.5 |
| 17 | 17 | 17.0 | 17.3 | 2.0 | 3.8 |
| 18 | 18 | 18.0 | 18.3 | 2.0 | 4.0 |
| 20 | 20 | 20.0 | 20.3 | 2.0 | 4.5 |

Dimensions in millimeters

TABLE 6

Tolerances for Wall Thickness of PE-RT Type I Pipe

| Minimum Wall Thickness $e_{min}$ > | Minimum Wall Thickness $e_{min}$ ≤ | Tolerance[a] X |
|---|---|---|
| 1.0 | 2.0 | 0.3 |
| 2.0 | 3.0 | 0.4 |
| 3.0 | 4.0 | 0.5 |
| 4.0 | 5.0 | 0.6 |
| 5.0 | 6.0 | 0.7 |
| 6.0 | 7.0 | 0.8 |
| 7.0 | 8.0 | 0.9 |
| 8.0 | 9.0 | 1.0 |
| 9.0 | 10.0 | 1.1 |
| 10.0 | 11.0 | 1.2 |
| 11.0 | 12.0 | 1.3 |
| 12.0 | 13.0 | 1.4 |
| 13.0 | 14.0 | 1.5 |
| 14.0 | 15.0 | 1.6 |
| 15.0 | 16.0 | 1.7 |
| 16.0 | 17.0 | 1.8 |
| 17.0 | 18.0 | 1.9 |
| 18.0 | 19.0 | 2.0 |
| 19.0 | 20.0 | 2.1 |
| 20.0 | 21.0 | 2.2 |
| 21.0 | 22.0 | 2.3 |

[a] The tolerance is expressed in the form $^{+x}_{0}$ mm, where x is the value of the tolerance given. The level of the tolerances conforms to ISO 11922-1, Grade V. Dimensions are in millimeters.

Mechanical Characteristics

Per the requirements of ISO 22391, the pipe is tested using the test methods and test parameters specified in Table 7.

TABLE 7

Mechanical Characteristics of PE-RT Type I Pipe

| Characteristic | Requirement | Hydrostatic (hoop) stress MPa | Test temperature °C. | Test period h | Number of test pieces | Test Methods |
|---|---|---|---|---|---|---|
| *For Individual Tests* | | | | | | |
| Resistance to internal pressure | No failure during the test period | 9.9 | 20 | 1 | 3 | ISO 1167-1 and ISO 1167-2 |
| | | 3.8 | 95 | 22 | 3 | |
| | | 3.6 | 95 | 165 | 3 | |
| | | 3.4 | 95 | 1,000 | 3 | |
| *For All Tests* | | | | | | |
| Sampling procedure | Not Specified | | | | | |
| Type of end cap | Type a) | | | | | |
| Orientation of test piece | Not Specified | | | | | |
| Type of test | Water-in-Waters | | | | | |

Physical Characteristics

The pipe is tested using the test method and test parameters, and conforming to the requirements of ISO 22391 as specified in Table 8.

TABLE 8

Physical Characteristics of PE-RT Pipe Type I

| Characteristic | Requirement | Test Parameters | | Test Methods |
|---|---|---|---|---|
| | | Parameter | Value | |
| Longitudinal reversion | ≤2% | Temperature | 110° C. | ISO 2505 |
| | | Duration of Exposure: | | |
| | | $e_n \leq 8$ mm | 1 h | |
| | | 8 mm > $e_n \leq 16$ mm | 2 h | |
| | | $e_n$ > 16 mm | 4 h | |
| | | Number of test pieces | 3 | |
| Thermal stability by hydrostatic pressure testing | No bursting during test period | Sampling procedure | Not specified | ISO 1167-1 and ISO 1167-2 |
| | | End cap | Type a) | |
| | | Orientation | Not specified | |
| | | Type of test | Water-in-air | |
| | | Hydrostatic (hoop) stress | Type I: 1.9 MPa | |
| | | ZZ | Type II: 2.3 MPa | ZZ |
| | | Test temperature | 110° C. | |
| | | Test period | 8,760 h | |
| | | Number of test pieces | 1 | |
| Melt mass flow rate (MFR) | 30% maximum difference compared to compound | Mass | 5 kg | ISO 1133-1 |
| | | Test temperature | 190° C. | |
| | | Test period | 10 min | |
| | | Number of test pieces | 3 | |

Maximum Calculated Pipe Value $S_{calc, max}$

Principles for the calculation of the maximum calculated pipe value, $S_{calc, max}$ values are provided below. Hence the determination of minimum wall thickness, $e_{min}$ of pipes, relative to the classes of service conditions (application class) in accordance with ISO 22391-1 Table 1 and the applicable design pressure, $p_D$.

Design Stress

The design stress, $\sigma_D$, for a particular class of service conditions (application class) is calculated using Equations (1) and (2), using Miner's rule in accordance with ISO 13760, and taking into account the applicable class requirements given above, and the service coefficients given in Table 9 below.

TABLE 9

Overall Service (Design) Coefficients

| Temperature ° C. | Overall service [design] coefficient C |
|---|---|
| $T_D$ | 1.5 |
| $T_{max}$ | 1.3 |
| $T_{mal}$ | 1.0 |
| $T_{cold}$ | 1.25 |

The resulting design stress, $\sigma_D$, as provided in ISO 22391, is given in Table 10 below.

TABLE 10

PE-RT Pipe Type I Design Stress

| Application class | Design stress[a] $\sigma_D$ MPa PE-RT Type I | Design stress[a] $\sigma_D$ MPa PE-RT Type II |
|---|---|---|
| 1 | 3.29 | 3.53 |
| 2 | 2.68 | 3.37 |
| 4 | 3.25 | 3.38 |
| 5 | 2.38 | 2.88 |
| 20° C. for 50 years | 6.68 | 7.47 |

[a]Values are rounded to the second decimal place (i.e. the nearest 0.01 MPa).

The derivation of the maximum value of $S_{calc}$, $S_{calc, max}$, is the smaller of the values obtained from Equations (A.1) and (A.2):

$$\frac{\sigma DP}{PD}, \qquad \text{A.1}$$

where $\sigma_{DP}$ is the design stress of the pipe material taken from Table A.2, in megapascal (MPa); and $p_D$ is the design pressure of 4 bar, 6 bar, 8 bar or 10 bar, as applicable, expressed in megapascal (MPa):

$$\frac{\sigma cold}{PD}, \qquad A.2$$

where $\sigma_{cold}$ is the design stress at 20° C. relative to a service life of 50 years (MPa); and $p_D$ is the design pressure of 10 bar, expressed in megapascal (MPa).

The valves of $S_{calc, \, max}$ relative to each class of service are given in Table 3.

The S series and $S_{calc}$ values are chosen for each application class and design pressure from Tables 5, 6, 7 or 8, as applicable, in such a way that S or $S_{calc}$ is not greater than $S_{calc, \, max}$ given in Table 1 for PE-RT Type I.

Example 1

Reactor granules from Comparative 2 (0.5 MI, 0.927 g/cc), Reference 1 (0.5 MI, 0.935 g/cc), and Reference 2 (0.2 MI, 0.940 g/cc) were mixed in a Coperion ZSK-57 twin screw extruder at 150 lbs/hr output rate with a standard antioxidant and metal deactivation additive package.

The density of the polyethylene composition referred to herein as Comparative 2 was 0.927 g/cm³ having a melt index of 0.5 g/10 min. The composition includes a processing aid additive and a thermal stabilizer additive and is used in applications such as blown film, collation shrink, food packaging, form fill and seal packaging, multilayer packaging film, heavy duty bags, shrink film, lamination film, and stand up pouches.

The density of the polyethylene composition referred to as Reference 2 was 0.940 g/cm3 having a melt index of 0.25 (190° C./2.16 kg). This composition includes a processing aid additive and a thermal stabilizer additive, and is used in applications such as collation shrink, lamination film, compression packaging, and multilayer packaging film.

Property Testing of the Polyethylene Composition

Figure 2:
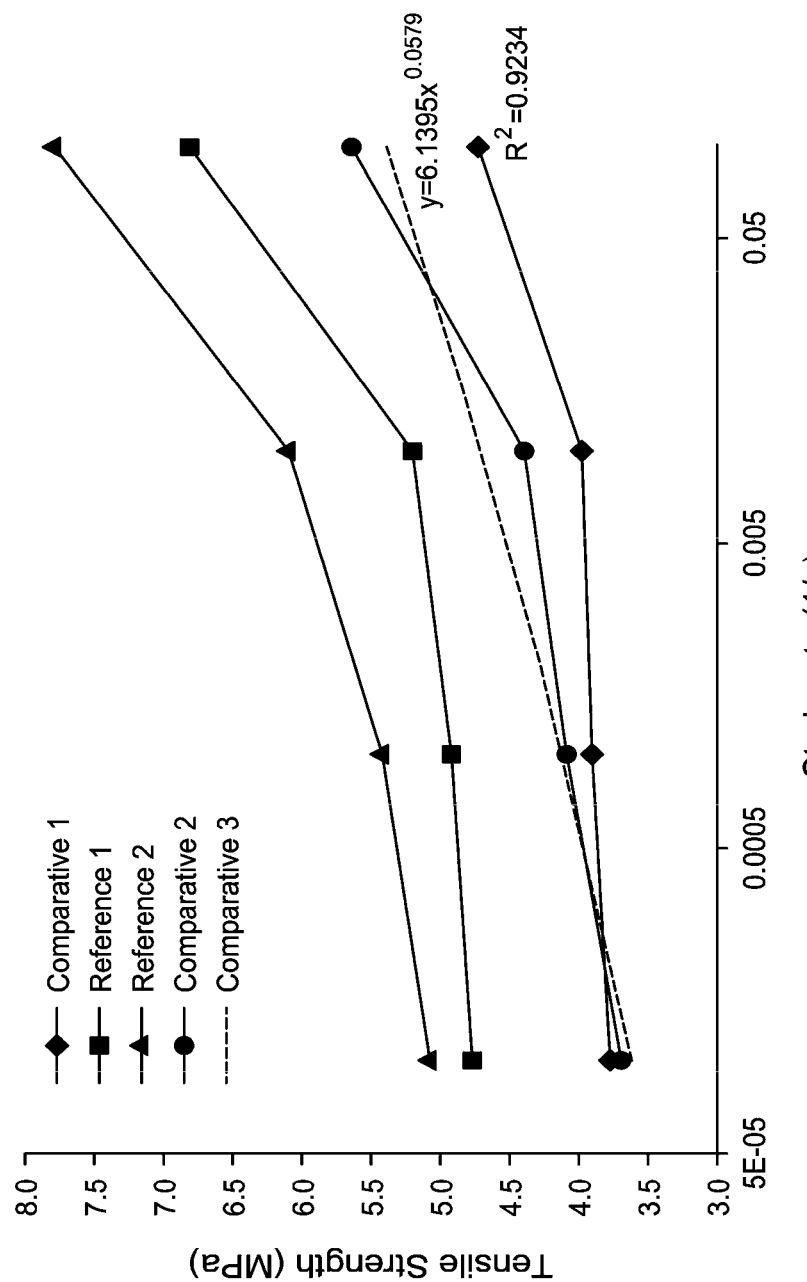
FIG. 2 is a graph representing the data of Example 1 described herein and that plots tensile strength of the polyethylene compositions against the strain rate.

Flexural modulus, tensile modulus, environmental stress crack resistance ("ESCR"), notched constant ligament series ("NCLS"), and oxidative induction temperature ("OTT") were measured for each sample and compared to an industry standard for PE-RT type I referred to herein as Comparative 1. The physical and thermal properties of the polyethylene compositions are summarized in Table 11A and Table 11B below. In addition, FIG. 2 shows the results from tensile strength studies at various strain rates at an elevated (70° C.) temperature acquired at Datapoint Labs.

TABLE 11A

Physical and Thermal Properties of Samples

| Sample Descriptions | Flexural Modulus 1% SecMod (Mpa) | Tensile Stress at Yield (Mpa) | Tensile Strain at Yield (%) | Tensile Strength (Mpa) | Tensile Modulus 1% Sec (Mpa) |
|---|---|---|---|---|---|
| Comparative 2 | 571.0 | 15.0 | 11.8 | 36.7 | 544.0 |
| Reference 1 | 796.0 | 19.0 | 10.9 | 38.4 | 759.0 |
| Reference 2 | 916.0 | 21.0 | 10.7 | 42.2 | 884.0 |
| Comparative 1 | 699.0 | 17.2 | 13.2 | 38.7 | 632.0 |

TABLE 11B

Additional Physical and Thermal Properties of Samples (continued)

| Sample Descriptions | ESCR - Bent Strip (10% lgepal, cond B) | NCLS (10% lgepal, 50° C., 800 psi) | Oxidative Induction Time 210° C. (min) | Onset of Thermal Degradation 210° C. (min) | Oxidation Rate 210° C. (mW/min) |
|---|---|---|---|---|---|
| Comparative 2 | >1000 hrs | >1008 hrs | 45.0 | 50.2 | 4.59 |
| Reference 1 | >1000 hrs | 692 hrs | 44.3 | 50.6 | 4.05 |
| Reference 2 | >1000 hrs | 280 hrs | 46.8 | 50.6 | 5.96 |
| Comparative 1 | >1000 hrs | >1008 hrs | 68.0 | 80.2 | 1.57 |

At a higher strain rate, the strength of the polyethylene composition (sometimes referred to as a "resin") was dominated by its density and MI. When the strain rate is low, due to its poor conomomer distribution, the strength of the Comparative 1 deteriorates quickly. In summary, the physical characteristics of the Reference 1 and Reference 2 polyethylene compositions meet or exceed those of the Comparative 1 incumbant composition for most physical property tests. Furthermore, each of the four polyethylene composition grades were shown to meet the 40 minute minimum requirement for oxidative induction temperature at 210° C.

Figure 3:
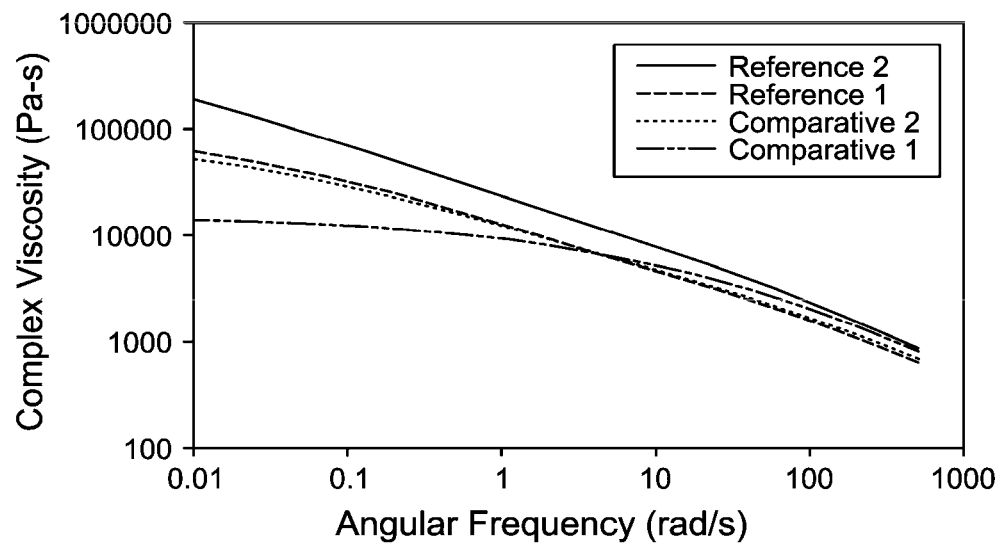
FIG. 3 is a graph that shows the results of small amplitude oscillatory shear rheology (viscosity at angular frequency) of Comparative 2, Reference 1, and Reference 2 polyethylene compositions as well as a control Comparative 1.
Figure 4:
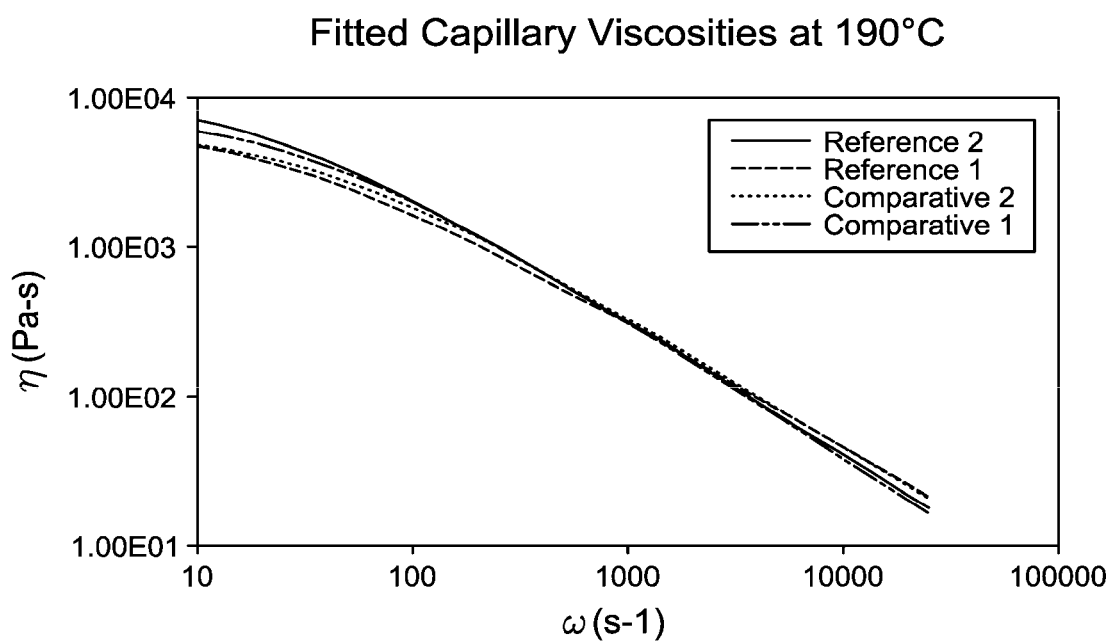
FIG. 4 is a graph that shows the results of capillary rheology (viscosity at 190° C.) acquired for polyethylene compositions: Comparative 1, Comparative 2, Reference 1 and Reference 2.

Small amplitude oscillatory shear ("SAOS") rheology and capillary rheology was acquired for the Comparative 2, Reference 1, and Reference 2 polyethylene compositions as well as the industry control Comparative 1 as shown in FIG. 3 and FIG. 4.

All measurements in small angle oscillatory shear have been conducted using TA Instruments advanced rheometric expansion system (ARES). Parallel plate fixtures of 25 mm were used for small-angle oscillatory shear measurements at 190° C. and a frequency range 0.01-628 rad/s (add here actual frequency-range). All measurements were made within the linear regime as confirmed from strain sweep experiments. After loading and every temperature change the samples have been equilibrated at constant temperature during approximately 30 minutes until normal forces were completely relaxed. In the course of the measurements, the sample has been kept under nitrogen protection to avoid thermal degradation.

From the complex viscosity response to angular frequency (shear rate) demonstrated in the figures, the polyethylene compositions advantageously demonstrate more shear thinning which for the 0.5 MI Comparative 2 and Reference 1 polyethylene compositions lead to lower viscosity in typical extrusion conditions (~10-1000 $s^{-1}$) when compared to the Comparative 1. (FIG. 3). The melt viscosity of the 0.2 MI Reference 2 indicated comparable viscosity to the Comparative 1 resin for the shear rates tested. (FIG. 3)

Example 2

Property Tests—Fabricated Pipe

Pipe samples for strength testing were fabricated in their standard multi-layer pipe structure with 16 mm outer diameter, 2 mm wall section, and an adhesive+EVOH barrier layer. Further, samples were fabricated with Comparative 2, Reference 1, and Reference 2 polyethylene compositions and compared to the incumbent benchmark composition, Comparative 1. Barrier composition was EVOH and process aid was used during fabrication.

Extrusion performance of Comparative 2 and Reference 1 polyethylene compositions were superior to the Comparative 1 polyethylene composition incumbent. Both Comparative 2 and Reference 1 polyethylene compositions processed through the line under standard extrusion rates of 17.6 m/min and were able to run at 22 m/min at still meet size and aesthetic requirements of quality control. Extrusion performance of Reference 2 polyethylene composition under standard control conditions was comparable to Comparative 1 which was less than optimal and deemed unsuitable. Both polyethylene compositions required polymer processing aid (PTFE based additive) to be added to eliminate drag marking. Internal coil memory assessment of all fabricated pipes was similar and deemed acceptable. Fabricated pipes of the Reference 1, Reference 2, and Comparative 2 polyethylene compositions were noticeably whiter than Comparative 1, which exhibited dull yellow tinge.

PE-RT Pipe samples were submitted for long term hydrostatic pressure testing, and the results are summarized below in Table 12. Reference 1 and Reference 2 included a synthetic hydrocarbon viscosity modifier that improves coil memory, but that could reduce the time of failure and cause the pipe to hold less pressure.

Example 3

Pipe samples for strength testing were fabricated by using a pipe extruder with nominal 16 mm outer diameter and 2 mm wall section.

Another PE-RT resin was produced for pipe extrusion and tests. It had a density of 0.935 g/cc and a MI of 0.5 g/10 min. PE-RT pipe samples were extruded by using an industrial pipe extruder. The nominal dimensions of the pipe samples were 20 mm outer diameter and 2 mm wall thickness. Various line speeds were tested from 10 to 40 meters per minutes against a commercial metallocene resin benchmark. Pipes were found to have good dimension and surface appearance.

Pipe samples were submitted for long term hydrostatic testing using DETERMINATION OF THE LONG-TERM HYDROSTATIC STRENGTH ISO 9080:2012ISO 9080 at 4 temperatures: 20, 70, 95 and 110° C. The pressure testing at 20, 70 and 95° C. was performed using deionized water on the inside and on the outside of the pipe specimens. 110° C. air is used on the outside. The accuracy temperature and pressure is better than ±1° C. and +2/−1% respectively. The measurement of the wall thickness are accurate within ±0.02 mm and the diameter 1 within ±0.1 mm.

Table 13 summarizes the results of the observations obtained from the tests of the 4 different temperatures. Table 14 summarizes distribution of stress rupture data.

TABLE 13

| Temperature | Total | Burst | On test | Stopped | Longest time to burst (hrs) | Longest testing time (hrs) |
|---|---|---|---|---|---|---|
| 20° C. | 56 | 23 | 26 | 7 | 8365 | 9431 |
| 70° C. | 59 | 22 | 29 | 8 | 6215 | 9431 |
| 95° C. | 54 | 28 | 18 | 8 | 6553 | 9431 |
| 110° C. | 51 | 18 | 27 | 6 | 2217 | 9431 |

TABLE 12

| | PE-RT Pipe Performance | | | | |
|---|---|---|---|---|---|
| Criteria | 20° C., 9.9 MPa 1 hr | 95° C., 3.8 MPa 22 hr | 95° C., 3.6 MPa 165 hr | 95° C., 3.4 MPa 1000 hr | 110° C., 1.9 MPa 8760 hr |
| Comparative 1 | terminated at 1 hr | failed at 1.7, 3, 3.9 hrs | failed at 38, 43, 168 hrs | terminated at 1200 hrs | failed at 7547 and 8243 hrs |
| Comparative 2 (additive-1A) | Abandoned | abandoned | failed at 0.3, 0.5, 0.8 hrs | failed at 31, 41, 74hrs | abandoned |
| Reference 1 (additive-1A) | terminated at 1000 hrs | terminated at 1000 hrs | terminated at 1000 hrs | terminated at 1200 hrs | Terminated at 8760 hrs |
| Reference 2 (additive-1A) | terminated at 1000 hrs | terminated at 1000 hrs | terminated at 1000 hrs | terminated at 1200 hrs | Terminated at 8760 hrs |
| Reference 1 (additive-1B) | 2 pieces failed at 310 hrs; 1 piece terminated at 1000 hrs | 1 piece failed at 666 hrs; 2 pieces terminated at 1000 hrs | terminated at 1000 hrs | terminated at 1200 hrs | 1 Terminated at 8760 hrs, 1 failed at 2995 hrs |
| Reference 2 (additive-1B) | terminated at 1000 hrs | terminated at 1000 hrs | terminated at 1000 hrs | terminated at 1200 hrs | Terminated at 8760 hrs |

Pipe pressure tests per ISO22391-2; Data Traceability EXOVA reports

TABLE 14

Distribution of stress rupture data

| Temperature | Total | Burst | On test | Stopped | >7000 hrs | >9000 hrs |
|---|---|---|---|---|---|---|
| 20° C. | 30 | 21 | 9 | 0 | 4 | 1 |
| 70° C. | 30 | 20 | 10 | 0 | 4 | 1 |
| 95° C. | 30 | 22 | 8 | 0 | 6 | 3 |
| 110° C. | 30 | 18 | 12 | 0 | 7 | 3 |

Table 15 summarizes the extrapolated strength values at $t_e$. By its LPL value of 9.69 MPa at 20° C. and 50 years the natural PE-RT pipe grade, this material has a minimum required strength (MRS) classification of 8 MPa and is thereby designated PE-RT 80 according to ISO 12162:2009.

TABLE 15

Extrapolated strength

| Temperature | $t_e$ | $t_e$ | $\sigma_{LTHS}$ | $\sigma_{LPL}$ |
|---|---|---|---|---|
| 20° C. | 907,600 hrs | 104 years | 9.860 MPa | 9.618 MPa |
| 70° C. | 453,821 hrs | 51.8 years | 5.793 MPa | 5.559 MPa |
| 95° C. | 36,305 hrs | 4.14 years | 3.805 MPa | 3.614 MPa |
| 110° C. | 9,076 hrs | 1.04 years | 2.619 MPa | 2.461 MPa |

The resulting design hoop stresses of the Miner's rule calculations for a design time of 50 years are presented below. Table 16 lists the resulting design Hoop Stress and conformity check with the application classes.

TABLE 16

Hoop Stress and conformity check with the application classes

| APPLICATION CLASS [ISO 10508] | $\sigma$LPL | ISO 22391 PE-RT type I | Results |
|---|---|---|---|
| 1 | 3.89 MPa | 3.29 MPa | Pass |
| 2 | 3.71 MPa | 2.68 MPa | Pass |
| 4 | 3.68 MPa | 3.25 MPa | Pass |
| 5 | 3.18 Mpa | 2.38 Mpa | Pass |
| Cold water (20° C., 50 yrs) | 7.76 MPa | 6.68 MPa | Pass |

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

We claim:

1. A PE-RT pipe made from a polyethylene composition comprising at least 50 mole percent ethylene derived units and one or more alpha-olefin co-monomer derived units, wherein the polyethylene composition has a molecular weight distribution ($M_w/M_n$) of from about 2 to about 6, a long chain branching index g'vis of from about 0.85 to about 0.99, a density of from about 0.934 to about 0.960 g/cm$^3$, and a shear thinning ratio of 1.0 to 100, and wherein the one or more alpha-olefin co-monomer derived units is derived from propylene, butene, 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-nonene; 1-nonene with one or more methyl, ethyl, or propyl substituents; ethyl, methyl, or dimethyl-substituted 1-decene; 1-dodecene; or a combination thereof.

2. The PE-RT pipe of claim 1, wherein the polyethylene composition has a tensile strength at 5% strain that satisfies the following relationship:

$$y > 6.1395 * x^{0.0579} + 0.2,$$

wherein y is the tensile strength (MPa) at 5% strain at 70° C. and x is the strain rate (s$^{-1}$).

3. The PE-RT pipe of claim 1, wherein the PE-RT pipe has at least a 16 mm external diameter, at least a 2 mm wall thickness and has a pipe rupture (failure) time at 95° C./3.8 MPa of 500 hours or greater.

4. The PE-RT pipe of claim 1, wherein the PE-RT pipe has at least a 6 mm external diameter, at least a 2 mm wall thickness and has a pipe rupture (failure) time at 95° C./3.4 MPa of 1,000 hours or greater.

5. The PE-RT pipe of claim 1, wherein the PE-RT pipe has at least a 16 mm external diameter, at least a 2 mm wall thickness and has a pipe rupture (failure) time at 110° C./1.9 MPa of 8,760 hours or greater.

6. The PE-RT pipe of claim 1, wherein the polyethylene composition has a melt index of from about 0.1 g/10 min to about 5 g/10 min.

7. The PE-RT pipe of claim 1, wherein the polyethylene composition has a melt index ratio ($I_{21.6}/I_{2.16}$) from about 25 to about 80.

8. The PE-RT pipe of claim 1, herein the polyethylene composition is made using one or more metallocene catalysts.

9. The PE-RT pipe of claim 1, wherein the polyethylene composition is a blend.

10. The PE-RT pipe of claim 1, wherein the polyethylene composition comprises at least one of a polymer processing aid, a thermal stabilizer, a slip agent, a nucleator, a flame retardant, an antioxidant, a filler, a colorant, or mixtures thereof.

11. The PE-RT pipe of claim 1, wherein the PE-RT pipe comprises two or more layers of extruded polyethylene composition.

12. The PE-RT pipe of claim 1, wherein the PE-RT pipe is a single layer of extruded polyethylene composition.

13. An assembly comprising the PE-RT pipe of claim 1.

14. The assembly of claim 13, wherein the assembly comprises two or more PE-RT pipes of claim 1.

* * * * *